United States Patent [19]

Burgess et al.

[11] Patent Number: 4,852,748
[45] Date of Patent: Aug. 1, 1989

[54] FERRIS WHEEL SHAPED FIXTURE HOLDING APPARATUS

[75] Inventors: William C. Burgess; Gary L. Jochum; David Goetzinger; David A. Beckius, all of Dubuque, Iowa

[73] Assignee: Deere & Company, Moline, Ill.

[21] Appl. No.: 158,414

[22] Filed: Feb. 22, 1988

[51] Int. Cl.⁴ ................................................ A47F 7/00
[52] U.S. Cl. .................................. 211/70.6; 211/164; 248/130; 248/202.1; 248/659
[58] Field of Search .................... 211/164, 1.3, 6, 7, 211/70.6, 167, 28, 44, 204, 206, 123; 248/130, 659, 202.1, 201, 251

[56] References Cited

U.S. PATENT DOCUMENTS

| | | | |
|---|---|---|---|
| 253,290 | 2/1882 | Hunter | 211/164 X |
| 765,162 | 7/1904 | Bernardi | 211/6 |
| 927,570 | 7/1909 | Maxry | 211/44 X |
| 1,501,633 | 7/1924 | Tyler | 211/164 |
| 1,830,373 | 11/1931 | Schmidt | 211/164 |
| 2,834,479 | 5/1958 | Kayton | 211/164 |
| 3,038,773 | 6/1962 | Vasbinder, Sr. | 211/164 X |
| 3,674,155 | 7/1972 | Kessler | 211/164 X |
| 3,784,024 | 1/1974 | Kristy | 211/164 X |

Primary Examiner—Alvin C. Chin-Shue
Assistant Examiner—David L. Talbott

[57] ABSTRACT

A ferris wheel shaped frame having a plurality of fixture storage locations along its periphery is used to store a plurality of fixtures. The fixtures are held in place by a pivoting member comprising a pivotable sleeve, and a latch comprising a removable nut and bolt assembly. When a fixture is to be used, it is unlatched and pivoted away from the frame so that the operator is unhampered during a work operation by the storage assembly.

2 Claims, 4 Drawing Sheets

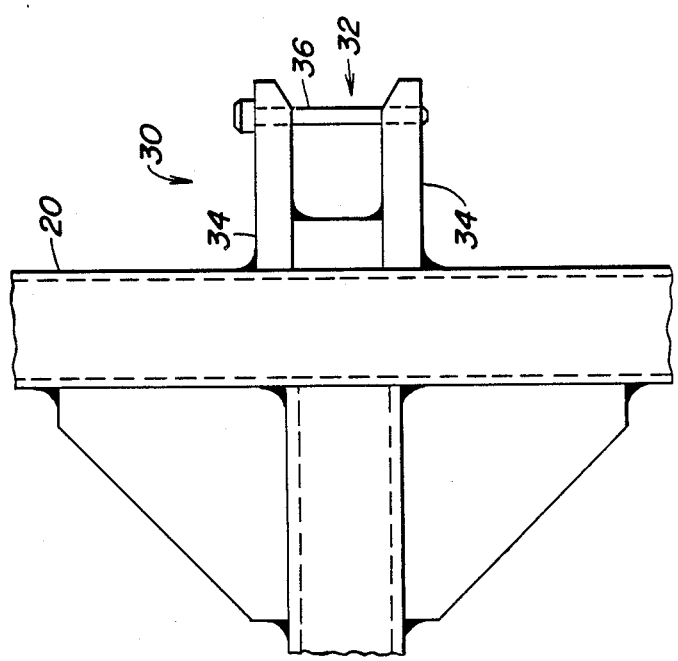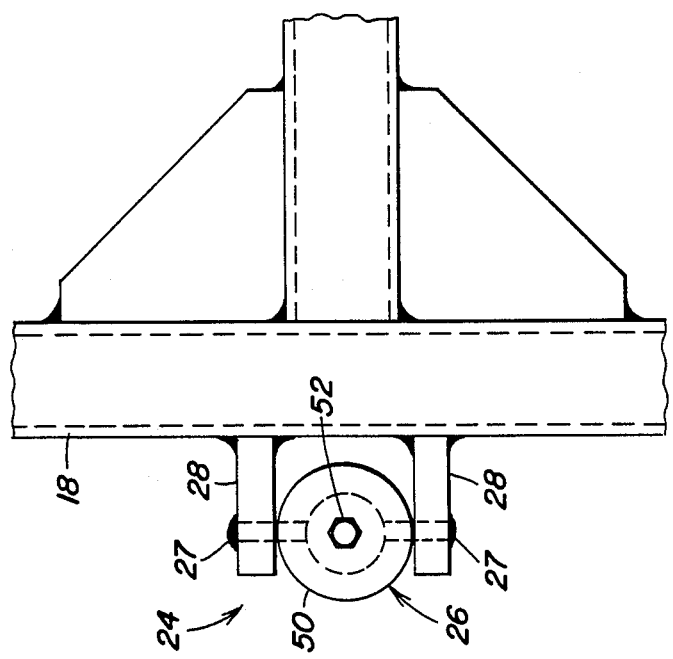

FERRIS WHEEL SHAPED FIXTURE HOLDING APPARATUS

BACKGROUND OF THE INVENTION

1. Field of the Invention:

The invention is directed to an apparatus for holding and storing a plurality of fixtures wherein the fixtures can be pivoted outwardly from the apparatus into a working position.

2. Description of the Prior Art:

During manufacturing, many fixtures are fabricated to correctly hold and position stock for different processing operations, such as welding. As these processing operations may occur at different intervals, the fixture is typically stored in a rack when not in use. The storage rack may be located in an area remote from the work area. In the past, such an arrangement has proved satisfactory because of relatively long production runs with each fixture. However, with the advent of just-in-time inventory and manufacturing systems, production runs have been reduced, resulting in increased changeover costs associated with storing, locating and mounting fixtures.

To overcome this problem, fixtures have been grouped together on fixture holding and working assemblies. In this way, a plurality of fixtures are readily available, so that the operator no longer has to store and retrieve fixtures during a job changeover.

SUMMARY OF THE INVENTION

It is the object of the present invention to provide an improved fixture storage apparatus in which a plurality of fixtures are readily accessible by the operator.

It is another object of the present invention to provide a fixture storage apparatus wherein the fixture can be pivoted from a stored position to a working position, wherein the operator will not be hampered by the storage assembly while using the fixture.

To accomplish these and other objects of the present invention, the invention comprises a ferris wheel shaped frame that is rotatably mounted on a mounting base. Along the periphery of the frame are fixture storage locations. The frame and mounting base are provided with an indexing means whereby the position of the frame relative to the mounting base can be fixed. Each fixture storage location comprises one pivoting member and one latching member. In operation, the operator selects the fixture to be used with a particular job. The operator then rotates the frame to the correct fixture storage location and locks the frame in place. The operator then unlatches the fixture and pivots it about the pivot axis of the pivoting member away from the frame so that the job can be performed.

BRIEF DESCRIPTION OF THE DRAWINGS

FIG. 4 is a detail view of the pivoting member.

FIG. 5 is a detail view of the latching assembly.

DETAILED DESCRIPTION

Figure 1:
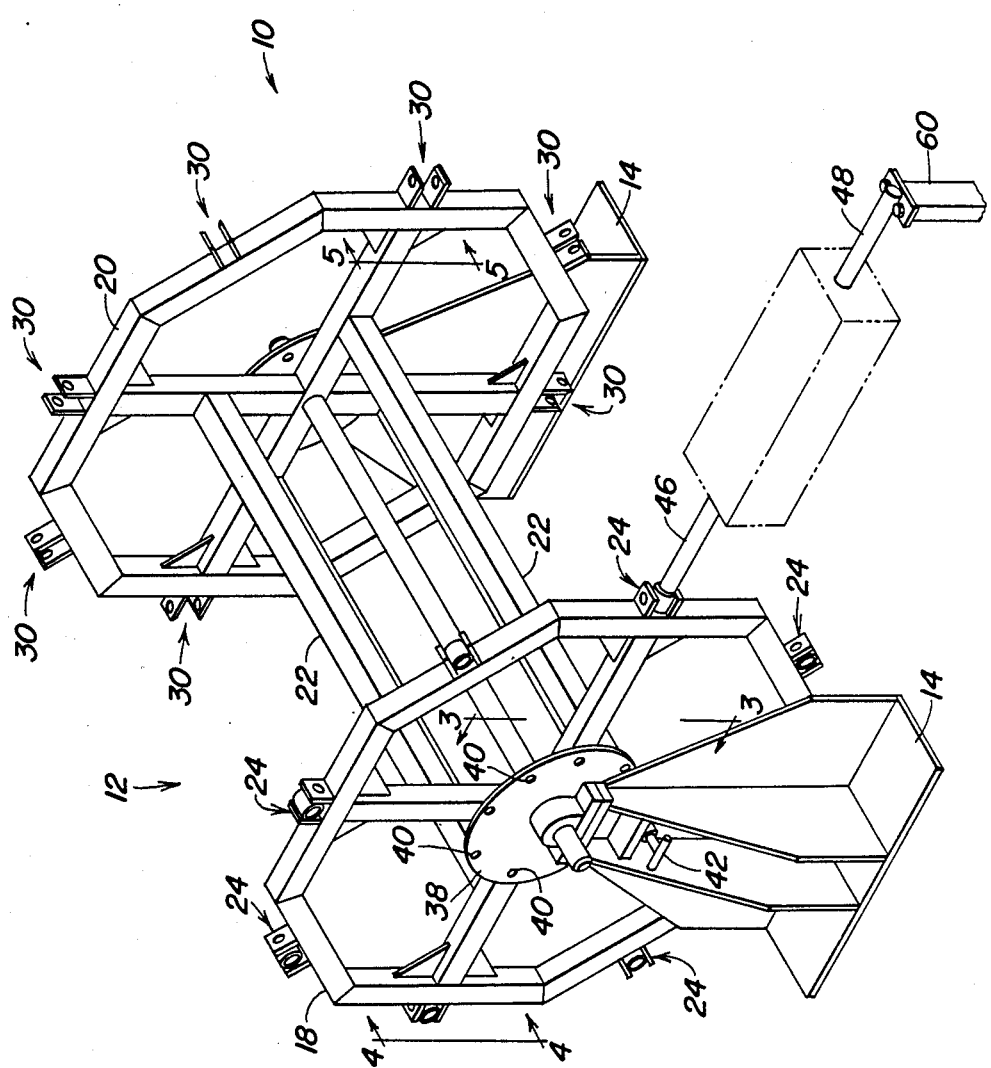
FIG. 1 is a perspective view of the storage apparatus wherein a fixture is in a working position.
Figure 2:
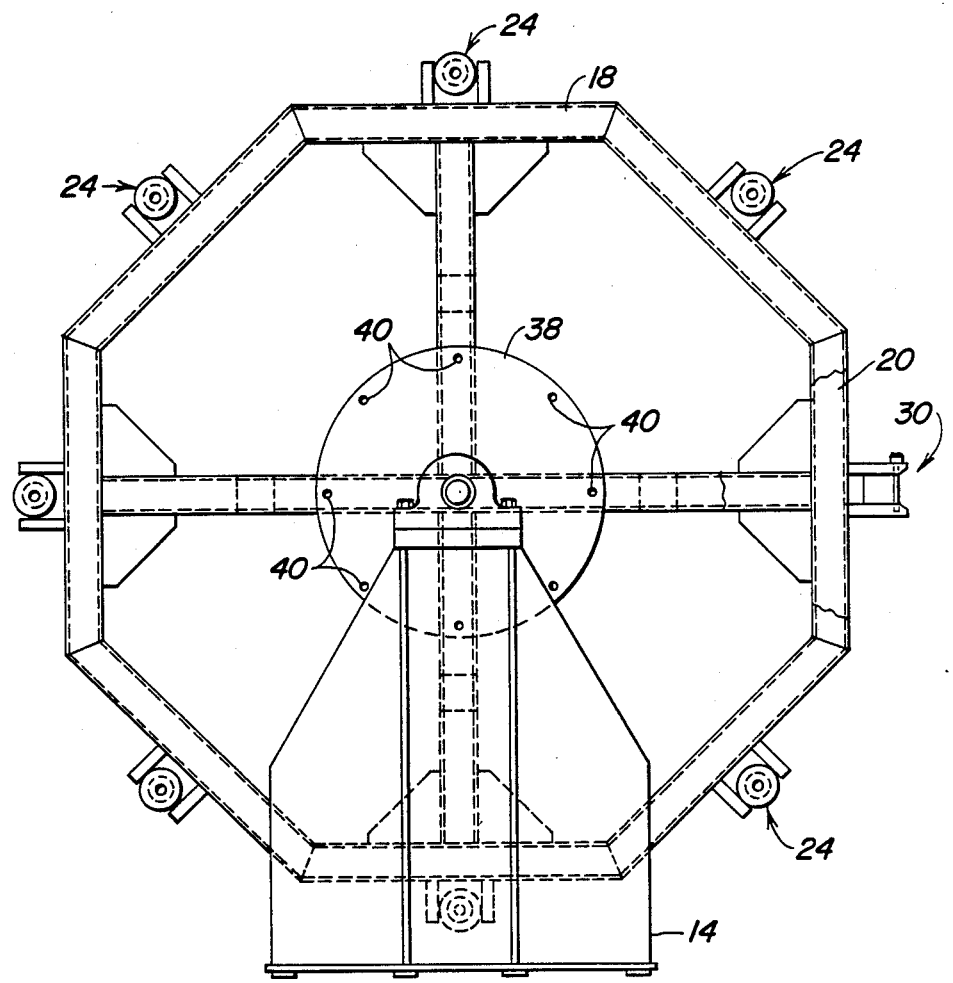
FIG. 2 is a side view of the storage apparatus.
Figure 3:
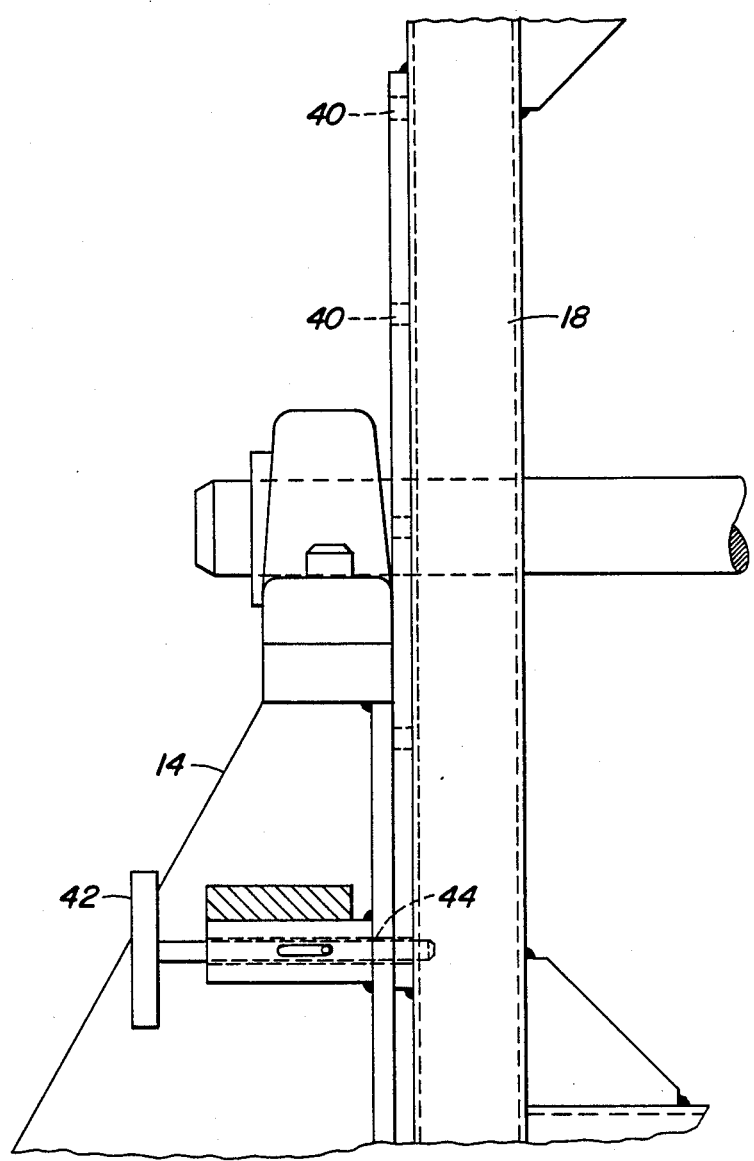
FIG. 3 is a detail view of the indexing assembly.

The invention is directed to a fixture holding and storing apparatus. The apparatus 10 comprises a frame 12 that is rotatably mounted to mounting base 14. Fixtures 16 are secured to the periphery of the apparatus.

Frame 12 is formed by octagonal frames 18 and 20 that are secured together by cross members 22. The center of each octagonal frame is journalled so that when it is mounted on mounting base 14, it is free to rotate. Octagonal frame 18 is provided with six mounting points 24 each of which being provided with pivoting member 26. The pivoting member 26 comprises a cylindrical sleeve that is pivotally secured by pins to brackets 28. Octagonal frame 20 is provided with eight latching points 30, each of which is provided with a latching assembly 32. Each latching assembly comprises a mounting bracket 34 through which is projected a nut and bolt assembly 36 for latching the fixture into a storage position on the frame. Indexing disc 38 is secured to hexagonal frame 18 and is provided with a series of holes 40 corresponding to the working position of the various fixtures on the frame. Pin 42 is inserted through aperture 44 on the mounting base and contacts one of the holes in the indexing disc thereby preventing rotation of the frame.

Each fixture is provided with a mounting frame comprising first and second trunnion 46 and 48, respectively, which are secured to the frame holding the fixture thereto. The first trunnion is pivotally secured to the frame by pivoting member 26. The end of the first trunnion is provided with a disc 50 that is bolted thereto by bolt 52 to prevent trunnion 46 from slipping out of the cylindrical sleeve. To remove trunnion 46 from the sleeve, the disc is unbolted and the trunnion slipped out of the sleeve. Second trunnion 48 is latched to the frame by latching assembly 32. More specifically, the trunnion is placed in the bracket 34 and bolt and nut assembly 36 is placed through the apertures located in the opposing flanges so that the trunnion cannot be pivoted away from the frame.

In using the apparatus, the operator selects what fixture to use and removes pin 42 permitting the frame to be rotated about a horizontal rotation axis. After positioning the fixture where desired, pin 52 is inserted through aperture 44 and into the correct indexing hole 40 to lock the frame in place. The operator then unbolts nut and bolt assembly 36 so that the fixture can be pivoted away from the frame about a vertical pivot axis of pivoting member 26 which is perpendicular to the rotation axis of the support frame. The operator then rests trunnion 48 on work stand 60 and is free to use the fixture as desired. It should be noted that work stand 60 may be provided with a clamp so that the fixture may be rotated and held in an angled condition for operator comfort. However, in most applications, this clamp is unnecessary because the fixture is mounted to a low point on the trunnions and, therefore, tends to orient in a horizontal condition.

By pivoting the fixture away from the frame during a work operation, the operator is free to access either side of the fixture. In addition, the operator is provided with a working area that is relatively spacious and remote from the storage frame. To store the fixture the operator pivots the fixture back to the frame and latches trunnion 48 in place by nut and bolt assembly 36.

The present invention should not be limited by the above described embodiment, but should be limited solely by the claims that follow.

We claim:

1. A fixture holding apparatus for holding a plurality of fixtures, the apparatus comprising:

a mounting base;

a support frame rotatively mounted on the mounting base for rotation about a rotation axis, the support frame defining an outer periphery;

an elongated fixture mounting assembly having a first end and a second end between which is mounted at least one fixture, the first and second ends of the fixture mounting assembly comprising first and second trunnions respectively, the first trunnion of the fixture mounting assembly is secured to a pivotable sleeve pivotally mounted to the outer periphery of the support frame, the pivotable sleeve defining a pivot axis that is substantially perpendicular to the rotation axis of the support frame, so that the fixture mounting assembly can be pivoted away from a stored position on the outer periphery of the support frame to a work position extending outwardly from the outer periphery of the support frame;

a latch for holding the fixture mounting assembly in the stored position by releasably securing the second trunnion to the outer periphery of the support frame; and indexing means for holding the support frame stationary relative to the mounting base.

2. A fixture holding apparatus as defined by claim 1 wherein the indexing means comprises a disc mounting to the frame adjacent to the mounting base which is provided with a plurality of apertures which line up with an aperture located in the mounting base, when the aperture in the mounting base and one of the apertures in the disc are aligned a pin may be inserted into the apertures locking the support frame relative to the mounting base.

* * * * *